July 8, 1969   J. E. LEVASSEUR   3,453,861
SQUARE WAVE FLUID PRESSURE GENERATOR
Filed April 25, 1967
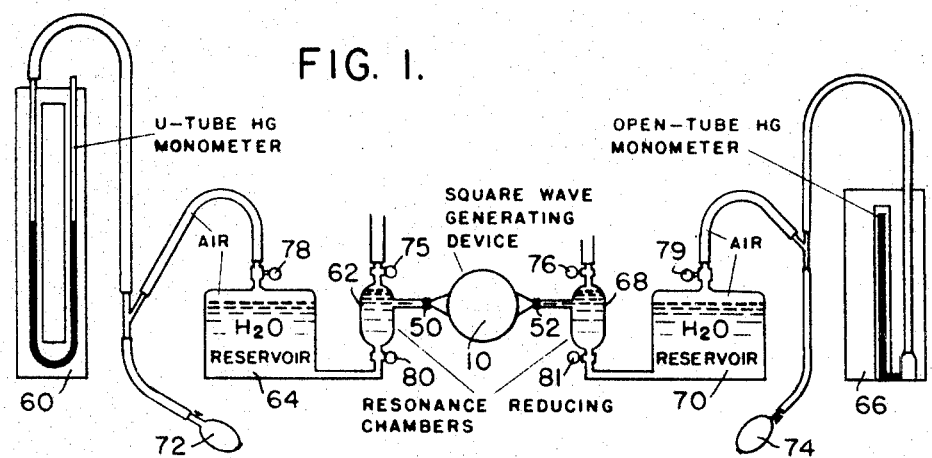
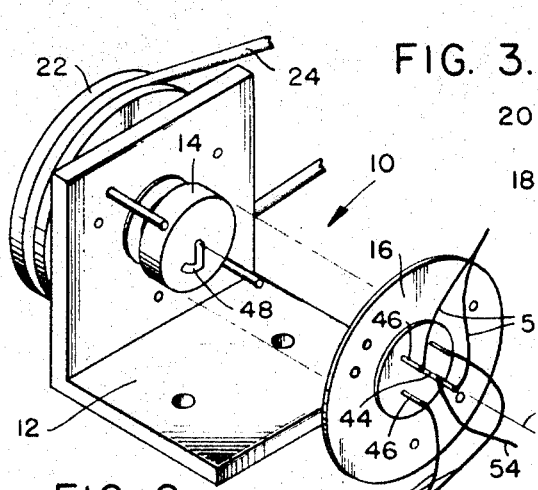
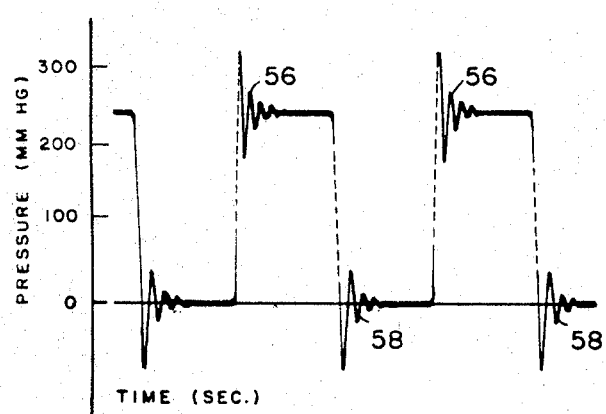
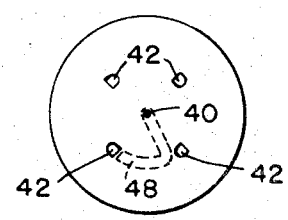
*INVENTOR.*
JOSEPH E. LEVASSEUR
BY
  ERVIN F. JOHNSTON
ATTORNEY.

United States Patent Office 3,453,861
Patented July 8, 1969

3,453,861
SQUARE WAVE FLUID PRESSURE GENERATOR
Joseph E. Levasseur, Richmond, Va., assignor, by mesne assignments, to the United States of America as represented by the Secretary of the Navy
Filed Apr. 25, 1967, Ser. No. 634,798
Int. Cl. G01l 27/00
U.S. Cl. 73—4                                                9 Claims

ABSTRACT OF THE DISCLOSURE

The present invention relates to a square wave fluid pressure generator which includes a rotor plate and a back plate which are mounted on a support element in a face-to-face relationship with respect to one another. The back plate has a central aperture which is aligned with the axis of rotation of the rotor plate and has additional apertures which are radially disposed from such axis of rotation. The rotor plate has a depression which extends from the central aperture to the radially disposed apertures in the back plate so that upon rotation of the rotor plate the depression communicates the central aperture alternately with the radially disposed apertures. When differential fluid pressures such as liquid pressures are applied between the radial apertures in the back plate the central aperture thereof provides a square wave pressure output.

---

The invention described herein may be manufactured and used by or for the Government of the United States of America for governmental purposes without the payment of any royalties thereon or therefor.

Fluid pressure generators are commonly used to test the dynamic response and calibrate pressure pick-up elements such as pressure transducers. The testing of a pressure transducer is most commonly based upon its dynamic performance when responding to either a sine wave function of pressure or to a square wave function of pressure. Because of the difficulties in designing a satisfactory sine wave pressure generator most prior art pressure generators produce a square wave function of pressure. The conventional method of producing such square wave pressures has been to rapidly turn a stopcock which is placed intermediately between the pressure transducer and some pressure source. Another method has been to abruptly rupture a rubber diaphragm which is located between the pressure transducer and the pressure source. In both of these methods a human error is introduced in the test pressure signal.

The present invention provides a pressure generator which produces a square wave function of pressure without the introduction of any human error. It is to be understood that the term "square wave" is to include any rectangular wave pressure forms. The present invention is a very simply constructed mechanical apparatus which includes a rotor plate and a back plate which are mounted on a support element in a face-to-face relationship with respect to one another. The back plate has a central aperture which is aligned with the axis of rotation of the rotor plate and has additional apertures which are radially disposed from said axis of rotation. The rotor plate has a depression or groove which extends from the central aperture to the radially disposed apertures so that upon rotation of the rotor plate the groove communicates the central aperture alternately with the radially disposed apertures. Differential liquid pressures are then applied between the radial apertures in the back plate so that upon rotation of the rotor plate the central aperture provides a square wave liquid pressure output.

An object of the present invention is to provide a simply constructed liquid pressure generator which is capable of producing liquid pressure waves other than the sine wave function.

Another object is to provide the generation of square or rectangular wave forms in a liquid testing system whose calibration under a static condition remains true and unaltered when the generating system is set into operation.

Another object is to provide a motor operable pressure generator which will accurately and successively reproduce a step function square wave pressure wave form.

A further object is to provide a simply constructed square wave fluid pressure generator which will reliably reproduce the wave form at high r.p.m.'s without undue heating.

Still another object is to provide a low cost, easily maintainable and operable square wave pressure generator which is extremely accurate and reliable in its operation.

Other objects, advantages and novel features of the invention will become apparent from the following detailed description of the invention when considered in conjunction with the accompanying drawing wherein:

FIG. 1 is a schematic illustration of the square wave generator in the middle of the figure along with means for providing differential pressures to the generator;

FIG. 2 is an exploded isometric view of the square wave pressure generator;

FIG. 3 is an exploded side view of the square wave pressure generator;

FIG. 4 is a view of the rotor plate taken along plane IV—IV of FIG. 3;

FIG. 5 is a view of the back plate taken along plane V—V of FIG. 3;

FIG. 6 is a schematic illustration of the face-to-face relationship of the rotor plate and the back plate; and FIG. 7 is a graph showing a representative square wave pressure output from the pressure generator.

Referring now to the drawing wherein like reference numerals designate like or similar parts throughout the several views, there is shown in FIG. 2 an exploded view of the fluid pressure generator 10. The generator may include a support element such as a stand 12, a rotor cylinder or plate 14 and a substantially stationary back element or plate 16.

A means may be provided for rotatably mounting the rotor plate 14 to the upstanding portion of the stand 12. As shown in FIG. 3, this means may include a shaft 18 which is connected to the rotor plate 14 and is journaled through the stand 12. The shaft 18 may be press fitted within the inner race of a roller bearing 20, the outer race of the roller bearing being press fitted within the stand 12. The shaft end extending from the stand 12 may be provided with a pulley 22 which may be operatively connected to a motor (not shown) by a belt 24. The rotor plate 14 is now adapted for rotation about an axis of rotation 26.

The back plate 16 may include a generally cylindrical shaped body 28 which is provided with a central bore 30 at one end and a reduced diameter portion 32 at an opposite end. The bore 30 may be of substantially the same diameter as the rotor plate 14 so that the rotor plate may slidably rotate therein. A means may be provided for mounting the back plate 16 to the stand 12 so that the back plate 16 is disposed in a face-to-face relationship with respect to the rotor plate 14 and with the rotor plate 14 disposed in the bore 30 for rotation therein. This mounting means may include an annular plate 34 which is press fitted to the reduced diameter portion 32 of the body 28 and bolts 36 which extend through the annular plate 34 and are threade into the upstanding portion of the stand 12. The bolts 36 may be provided with springs 38 between their heads and the annular plate 34 for resiliently biasing the bottom face of the bore 30 against the front face of the rotor plate 14.

The rotor plate 14 and the back plate 16 are configured in a particular manner so that upon rotation of the rotor plate 14 pressure inputs to the back plate 16 will be modulated to provide a square wave function pressure output. It is to be understood that the term "square wave" is to be used in a generic sense to include all rectangular pressure wave forms. The back plate 16 is configured with a central aperture 40 which is aligned with the axis of rotation 26, and a plurality of radially disposed apertures 42 which are misaligned with respect to the axis of rotation 26. These apertures are all located radially outward from the central apetrure 40 and within the bore 30. Small conduits 44 and 46 may be press fitted in the apertures for providing a means of connection to the input and output pressure lines which will be discussed in more detail hereinafter.

As shown in FIGS. 4 and 6 the rotor plate 14 is configured with a depression 48 which extends from the central aperture 40 of the back plate to the radial dimensions of the radially disposed apertures 42. The depression 48 is shaped such that it communicates the central aperture 40 alternately with the radially disposed apertures 42. In this manner when a differential of pressures is applied between the apertures 42 the central aperture 40 will have a pressure output which varies in magnitude between this differential and pressures. Accordingly, the rotation of the depression 48 makes and breaks the liquid pressure circuits between the central aperture 40 and successive radially disposed apertures 42. In this manner a desired square wave or rectangular wave pressure output may be obtained from the central aperture 40.

In the preferred embodiment of the invention the back plate 16 is provided with four of the radially disposed apertures 42 which are disposed at 90° intervals about a common circumference, as shown in the figures. As shown in FIG. 2, high pressure circuit lines 50 may then be slip fitted onto a pair of diagonally disposed conduits 46 and low pressure circuit lines 52 may be slip fitted onto the other pair of diagonally disposed conduits 46. As shown in FIG. 6, the depressions 48 within the rotor plate 14 may comprise a groove which extends radially from the central aperture 40 to the common circumference of the radially disposed apertures 42, after which the groove extends less than 90° along such common circumference. The exact number of degrees that the groove extends along the common circumference will depend upon the size of the radially disposed apertures 42.

In the preferred embodiment the groove 48 is to communicate only one of the radially disposed apertures 42 with the central aperture 40 at any one time. With the pressure lines 50 and 52 applying a high liquid pressure to one pair of diagonal apertures 42 and a low pressure to the other pair of diagonal apertures 42, it can be readily visualized from FIG. 6 that upon rotation of the rotor plate 14 the groove 48 will successively communicate individual radially disposed apertures 42 with the central aperture 40 so that a square or rectangular pressure wave output is provided at aperture 40. A liquid pressure line 54 may be slip fitted onto the conduit 44 for communicating the liquid pressure wave output from the aperture 40 to a device which is to be calibrated, such as a pressure transducer.

Special attention is given to the configuration of the radially located apertures 42 and of the distal end of the arc portion of the depression 48 in the rotor plate 14. That portion of each radially disposed aperture 42, which faces the approaching arc of the depression as the rotor plate 14 is set in clockwise motion about its axis of rotation, is squared as seen in FIG. 6. In like manner, the distal end of the arc of the depression 48 is squared. Prior art physiological pressure transducers are displacement transducers (as opposed to force transducers, etc.) and of necessity, the square wave liquid pressure generator device will experience a flow of water through its liquid passages proportional to the displaced diaphragm of the pressure transducer. Resistance to flow of this type of fluid, as compared to that in gas pressure generators, is significant. In the present invention the initial cross-section through which fluid may flow is increased by the square configurations so that the resistance to flow is reduced, resulting in an increase in sudden pressure transmission across those points.

FIG. 7 illustrates a representative liquid pressure wave form of the pressure output at aperture 40 upon the operation of the liquid pressure generator 10. It can be seen from this figure that the positive and negative transients, 56 and 58 respectively, and the plateaus of the pressure form have been reproduced exactly. It is obvious that the length of the plateau of the square or rectangular wave may be controlled by the rate of rotation of the rotor plate 14. When this rate is increased the plateau is shortened and when this rate is slowed the plateau is lengthened. For calibration purposes the practical upper limit of rate of rotation of the rotor plate 14 (or the frequency of the pressure wave output) is where the plateau commences cutting into the oscillatory cycling of the positive and negative transient responses 56 and 58.

A means for applying differential fluid pressures between the radial apertures 42 is schematically shown in FIG. 1. The high pressure liquid lines 50 may be connected to a U-tube mercury manometer 60 through a resonance reducing chamber 62 and a water reservoir 64, and the low pressure liquid lines 52 may be connected to an open-tube mercury manometer 66 through a resonance reducing chamber 68 and a water reservoir 70. As shown in FIG. 1, the resonance reducing chambers, the water reservoirs, and the mercury manometers are connected by various high pressure rubber or plastic tubes. The tubes connecting the water reservoirs 64 and 70 to the mercury manometers 60 and 66 respectively are provided with respective squeeze bulbs 72 and 74. By selectively squeeze pumping the bulbs 72 and 74 and taking a reading on the manometers 60 and 66, desired differential pressures may be established in the water reservoirs 64 and 70.

Stopcocks 75 and 76 at the tops of chambers 62 and 68 are provided to enable the complete filling of the chambers 62 and 68 with water from the water reservoirs 64 and 70 by allowing the escape of air when the filling pressure is applied via the squeeze bulbs 72 and 74. After the chambers 62 and 68 are completely filled the stopcocks 75 and 76 are closed. Stopcocks 80 and 81 at the bottoms of chambers 62 and 68 are provided to enable the disconnection of the liquid pressure line 54 from the conduit 44 without the subsequent emptying of the water filled lines 50 and 52 between conduits 46 and the resonance reducing chambers 62 and 68. The tubes connecting the water reservoirs 64 and 70 to the mercury manometers 60 and 66 respectively are filled with air, whereas the remainder of the pressure generating system between the water reservoirs 64 and 70 and the trial pressure transducer (not shown) is water filled. This latter portion of the system must be absolutly free of any air bubbles, no matter how minute; otherwise, the pressure generating system will absorb from the trial gauge varying amounts of pressure energy, and thus defeat one of the main purposes of this square wave liquid pressure generator. By first closing stopcocks 80 and 81 before breaking any connections of the water filled portion of the system, the time consuming process of careful refilling is thus eliminated and the exchange of trial gauges is a simple matter.

When the square wave liquid pressure generator 10 is operated under a steady state condition, the stopcocks 78 and 79 located on top of the water reservoirs 64 and 70 respectively are kept opened. When the square wave liquid generator device is kept in good condition, as indeed it must be to obtain test data which is absolutely reliable, there is little or no seepage of water between the rotor plate 14 and the back plate 16 and there is very little shunting or "pumping" of water from the high pressure side of the system to the low pressure side of the system. The volume of liquid within the square wave liquid pressure generator device itself is exceedingly small compared to the volume of fluid within the pressure sources, namely the U-tube mercury manometer 60 to the water reservoir 64 inclusively and the open-tube mercury manometer 66 to the water reservoir 70 inclusively. By virtue of all these properties of the overall system, the steady state condition is established when the input pressure within the liquid lines 50 is continuously maintained by the relatively infinite source of high pressure provided by the U-tube Hg manometer 60, and when the output pressure within the liquid lines 52 is continuously maintained by the relatively infinite source of low pressure provided by or through the open-tube Hg manometer 66. The open-tube Hg manometer may be opened to room air, in which case the output pressure would necessarily be atmospheric pressure.

When the square wave liquid pressure generator device 10 is not operated under a steady state condition, stopcock 78 may be closed and stopcock 79 left opened. In this case, the constant rotation of rotor plate 14 will produce repeated square pressure waves with the positive pressure step-function of each successive wave form reduced by an equal decrement in pressure. If stopcock 78 is kept opened and stopcock 79 closed, equal decrements of pressure occurs in each successive negative step-function of pressure. In both cases, the pressure differential goes to zero. Tests under the steady state condition and the two non-steady state conditions described above provide a rigid and thorough test for linearity determination on a pressure transducer.

The resonance reducing chambers 62 and 68 act as locks whose purpose it is to functionally block standing or reflecting pressure waves set up by the oscillating diaphragm of the trial transducer (not shown). The chambers impede the formation of resonance level(s) within the square wave liquid pressure generating system itself. Since the pressure generating system is effectively coupled to the trial transducer, resonance(s) arising in the testing system can mask and/or distort the response of the transducer itself. Alternatively, the block could be obtained by closing stopcocks 80 and 81 or by closing stopcocks placed in the lines 50 and 52; however, the pressure generating system could not operate under a steady state condition because its liquid pressure transmission lines 50 and 52 would be physically severed from their pressure sources.

The materials used in constructing the pressure generator 10 may be primarily metal such as aluminum. I have found it desirable to construct the rotor plate 14 and the back plate 16 of nylon so as to provide good sliding action therebetween. The pressure of the front face of the rotor plate 14 against the bottom of the bore 30 of the back plate 16 may be finely adjusted by the compression in the springs 38. All tubular connections and containers, including the water reservoirs 64 and 70 and the resonance reducing chambers 62 and 68, which make up the liquid filled portion of square wave pressure generator system must be constructed with rigid materials. These materials may be glass, various alloys of metals which are non-reacting with salt solutions, or some plastics which display little or no compliance to variations in pressure between 0–2 atmospheres.

In the steady state operation of the present invention the pressure generator is connected to the pressure sources as shown in FIG. 1 and the squeeze bulbs 72 and 74 are operated until desired differential pressures are established in the water reservoirs 64 and 70. The stopcocks on the water reservoirs are then kept opened, the top stopcocks on the resonance reducing chambers 62 and 68 are closed, and the bottom stopcocks thereof are opened. A motor (not shown) connected to the pulley 22 is then operated causing the rotor plate 14 to rotate within the bore 30 of the back plate 16. The groove 48 then makes successive communication between the central aperture 40 and the radially disposed apertures 42 which alternately provide high pressure and low pressure sources for the trial transducer (not shown). For instance, if in FIG. 6 the rotor plate 14 is rotating in a clockwise direction and the lower left and upper right apertures 42 are under a high pressure, and the lower right and upper left apertures 42 are under a low pressure, the groove 48 would be just commencing connection between the high pressure lower left aperture 42 and after 90° rotation this connection would terminate and the groove 48 would commence connection of the central aperture 40 with the low pressure upper left aperture 42. This cycling of the pressure wave would continue to produce a pressure form substantially as that shown in FIG. 7.

I claim:
1. A square wave fluid pressure generator comprising:
   a support element;
   a rotor plate;
   means rotatably mounting the rotor plate to said support element;
   a back plate;
   means for mounting the back plate to the support element in a face to face relationship with respect to said rotor plate;
   said back plate having a central aperture which is aligned with the axis of rotation of the rotor plate;
   said back plate having a plurality of radially disposed apertures aligned along a common circumference; and
   said rotor plate having a depression which extends radially from the central aperture to said common circumference and then extends a distance along said common circumference so that upon rotation of the rotor plate said depression communicates the central aperture alternately with the radially disposed apertures, whereby upon applying differential fluid pressures between the radial apertures the central aperture provides a square wave fluid pressure output.

2. A square wave fluid pressure generator as claimed in claim 1 wherein:
   the face of the back plate has a central bore which extends radially beyond the radial apertures; and
   the rotor plate is circular and is slidably disposed within said central bore.

3. A square wave fluid pressure generator as claimed in claim 1 including means for applying differential fluid pressures between the radial apertures.

4. A square wave fluid pressure generator as claimed in claim 3 wherein the means for applying differential fluid pressures includes a resonance reducing means.

5. A square wave fluid pressure generator as claimed in claim 1 wherein:
   the distal end of said groove along the common circumference is squared; and
   the radially disposed apertures along their sides, which first communicate with said distal end of the groove, are each squared, whereby a sudden pressure transmission of fluid is effected as the groove comes into communication with each radially disposed aperture.

6. A square wave fluid pressure generator as claimed in claim 5 wherein:
   the back plate has four of the radially disposed apertures which are disposed at 90° intervals about said common circumference; and
   said groove extends less than 90° along said common circumference.

7. A square wave fluid pressure generator as claimed in claim 6 wherein:
   the face of the plate has a central bore which extends radially beyond the radial apertures; and
   the rotor plate is circular and is slidably disposed within said central bore.

8. A square wave fluid pressure generator as claimed in claim 7 wherein the back plate mounting means resiliently biases the back plate against the rotor plate.

9. A square wave fluid pressure generator as claimed in claim 8 including means for applying differential fluid pressures between the radial apertures.

References Cited

UNITED STATES PATENTS

| | | | |
|---|---|---|---|
| 2,033,466 | 3/1936 | Grant | 137—625.41 XR |
| 2,034,281 | 3/1936 | Buchholz | 137—625.41 XR |
| 2,849,881 | 9/1958 | Anderson | 73—290 |
| 2,976,715 | 3/1961 | Roese et al. | 73—4 |
| 3,198,018 | 8/1965 | Broerman | 73—422 |
| 3,246,667 | 4/1966 | Pemberton | 137—625.41 XR |
| 3,326,046 | 6/1967 | Risher | 73—4 XR |

LOUIS R. PRINCE, *Primary Examiner.*

HARRY C. POST III, *Assistant Examiner.*